United States Patent
Gans et al.

(10) Patent No.: US 8,329,642 B1
(45) Date of Patent: Dec. 11, 2012

(54) FORMULA AND METHOD TO ENHANCE EXTERNAL PHYSIOGNOMY

(76) Inventors: Eugene H. Gans, Westport, CT (US); Michelle Yagoda, New York, NY (US)

( * ) Notice: Subject to any disclaimer, the term of this patent is extended or adjusted under 35 U.S.C. 154(b) by 922 days.

(21) Appl. No.: 12/271,112

(22) Filed: Nov. 14, 2008

Related U.S. Application Data

(60) Provisional application No. 60/987,885, filed on Nov. 14, 2007.

(51) Int. Cl.
*A61K 38/00* (2006.01)
(52) U.S. Cl. .................................. 514/2; 514/8; 514/23
(58) Field of Classification Search ........................ None
See application file for complete search history.

(56) References Cited

U.S. PATENT DOCUMENTS

| | | |
|---|---|---|
| 3,701,666 A | 10/1972 | Winitz |
| 4,025,650 A | 5/1977 | Gans et al. |
| 4,042,688 A | 8/1977 | Gans et al. |
| 4,053,589 A | 10/1977 | Gans et al. |
| 4,208,429 A | 6/1980 | Fraser |
| 4,833,128 A | 5/1989 | Solomon et al. |
| 4,981,699 A | 1/1991 | Inada et al. |
| 5,080,921 A | 1/1992 | Reimer |
| 5,422,127 A | 6/1995 | Dube et al. |
| 5,480,865 A | 1/1996 | Kingham |
| 6,194,009 B1 | 2/2001 | Kamarel |
| 6,365,218 B1 | 4/2002 | Borschel et al. |
| 6,475,539 B1 | 11/2002 | DeWille et al. |
| 6,589,576 B2 | 7/2003 | Borschel et al. |
| 7,070,825 B2 | 7/2006 | Ndife et al. |
| 2006/0088574 A1* | 4/2006 | Manning et al. .............. 424/439 |

* cited by examiner

*Primary Examiner* — Yunsoo Kim
(74) *Attorney, Agent, or Firm* — Pearne & Gordon LLP

(57) ABSTRACT

The present invention is directed to nutritional compositions for systemic ingestion that improve the overall appearance, or physiognomy, of a person, and to methods of use of such compositions. In one aspect of the present invention, the nutritional composition comprises highly available nutritional oils and peptides/proteins that are known to enhance hair, skin, and nails. In another aspect of the present invention, the nutritional composition comprises a powder that is dispersible in a liquid dispersion or emulsion. In another aspect of the present invention, the nutritional composition is a liquid dispersion or emulsion. In another aspect of the present invention, the method of use of the nutrient composition comprises dispersing a dose of 20 grams of the composition in the form of a powder into a liquid of choice, followed by stirring and swallowing of the liquid.

15 Claims, No Drawings

FORMULA AND METHOD TO ENHANCE EXTERNAL PHYSIOGNOMY

CROSS-REFERENCE TO RELATED APPLICATIONS

This application claims the benefit of U.S. Provisional Application No. 60/987,885, filed on Nov. 14, 2007, the entire disclosure of which is hereby incorporated herein by reference.

FIELD OF THE INVENTION

The present invention relates to a nutritional composition that upon systemic ingestion enhances the overall general appearance, or physiognomy, of a person, and to a method of use of the composition. The composition comprises nutritional oils and peptides/proteins that are highly available and/or highly bioavailable and that are known to enhance hair, skin, and nails, and also preferably includes carbohydrates and minerals as contributing active ingredients, and nutritional aids and carriers as other preferred but optional ingredients.

BACKGROUND OF THE INVENTION

The problem of imperfections in the appearance of people's hair, skin, and nails, and particularly women's hair, skin, and nails, is well known. For example, ample literature exists attesting to the benefits of oils, proteins, and minerals in enhancing hair, skin and nails. However, many women perceive themselves to have, or are perceived by others to have, significant hair, skin and/or nail problems despite the women believing that they have adequate diets including sources of oils, proteins, and minerals.

One approach to solving the problem of imperfections associated with hair, skin, and nails has been topical application of cosmetic products to certain areas or parts of the hair, skin, and nails. However, topical application of cosmetic products only tends to improve the appearance of the areas or parts of the hair, skin, or nails to which the products have been applied. Thus, topical cosmetic products generally must be applied to each area or part that requires improvement, e.g. the knees and legs, the arms and elbows, the front, side, and back of the neck, the back, the chest and breasts, the stomach, the groin and thighs, the forehead, the hands, and other parts of the body, in order for the area or part to exhibit an improved appearance. Such an approach can be time consuming, and often impractical, when applied to many areas or parts. The improvement of appearance of each area or part also tends to be temporary, lasting only until the effect of the topically applied cosmetic wears or washes off, at which point another time consuming application becomes necessary.

Another approach to solving the problem of imperfections associated with hair, skin, and nails has been the injection of polymers into wrinkles and other body cavities for cosmetic and surgical reasons. The polymers for injection include hyaluronic acid (e.g. Restylane and Perlane), apatite and hydroxyapatite, endogenous fats, various silicones, and other space-filling materials. However, injection of such polymers may result in adverse effects due to immune, irritating, or sensitizing effects caused by the polymers and to unsightliness and infections due to the injections and related surgical interventions. Moreover, while injections can help certain skin cavities, they cannot resolve dry, scaly skin. The physical insult of excessive injections has also limited their use outside of the facial/forehead area (e.g. the legs, chest, and neck areas). In addition, injections cannot help resolve defects in hair and nails.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with the present invention, it has been realized that the underlying problem of imperfections in the appearance of hair, skin, and nails is based on the body generally producing flawed dermal, epidermal, and keratin tissues that make up hair, skin, and nails, thus producing an imperfect appearance overall. Moreover, it has been realized that a diet merely including oils, proteins, and minerals in general, rather than highly available oils, proteins, and minerals in particular, would not solve the problem. Apparently, many women may not be eating sufficient amounts of the highly available oils, proteins, and minerals. Moreover, many women may not be able to efficiently digest and extract enough essential lipids and peptides from the oils and proteins in their diets, because diets typically include complex proteins and fats from meat, fish, fowl, etc. Apparently, normal daily ingestion, absorption, and metabolism of regular foods occurs relatively slowly and the bio-availability of lipids from fats and oils and of peptides and amino acids from proteins can be much delayed because the body must first liberate the lipids, peptides, and amino acids from the more complex forms of fats, oils, and proteins that are present in animal and vegetable food sources. With normal digestion, it takes four to six hours to break down foods into their usable forms. The body receives a slow, steady trickle and rations it out. A theory of the present invention is to provide the body with an ample quantity of readily absorbable peptides and lipids all at once, allowing the body to go into synthesis mode all at once.

Thus, the present invention generally relates to a nutritional composition that upon systemic ingestion enhances the overall general appearance, or physiognomy (i.e. estimation of one's character by a study of the overall external bodily features), of a person. The invention also relates to a method of using the nutritional composition to enhance the overall general appearance of a person.

In accordance with one aspect of the present invention, the nutritional composition comprises nutritional oils and peptides/proteins that are highly available and that have been known individually to enhance hair, skin, and nails, but that had not previously been known in combination to enhance the overall general appearance (physiognomy), making a person appear more vigorous and healthy. A theory of the present invention is that the use of highly available nutritional oils and peptides/proteins, which are in forms that are quickly and readily digestible, better stimulates the enhanced formation of skin, hair, and nails to improve overall appearance.

In accordance with another aspect of the present invention, the nutritional composition also preferably includes carbohydrates and minerals as contributing active ingredients, and includes nutritional aids and carriers as other preferred but optional ingredients.

In accordance with another aspect of the present invention, the nutritional composition is a powder that is dispersible in aqueous liquid. The nutritional composition is highly bioavailable and may be absorbed with minimal or no prior digestion.

In accordance with another aspect of the present invention, the nutritional composition is a liquid dispersion or emulsion.

In accordance with another aspect of the present invention, the method of use of the nutritional composition involves dispersing a dose of the composition in the form of a powder into a liquid of choice, such as water or juice, by stirring, followed by swallowing of the aqueous dispersed powder.

DESCRIPTION OF EXAMPLE EMBODIMENTS

Example embodiments that incorporate one or more aspects of the present invention are described. These examples are not intended to be a limitation on the present invention. For example, one or more aspects of the present invention can be utilized in other embodiments. Moreover, certain terminology is used herein for convenience only and is not to be taken as a limitation on the present invention.

As used herein, when a range such as 5-25, 5 to 25, or between 5 and 25 is given, this means preferably at least 5 and, separately and independently, preferably not more than 25. Also as used herein, a weight/weight % (w/w %) refers to weight of a material in a weight of the formulation in a dry, typically powder, form, rather than, for example, in a liquid dispersion or emulsion form. By way of example, a formulation with a nutritional oil at 50 w/w % includes a nutritional oil at a weight equal to the sum of the weights of all of the remaining substances of the dry formulation.

As those skilled in the art of nutritional compositions are aware, many countries around the world have set standards or reference values for the intake of vitamins and minerals for the typical human being. For example, the United States has Dietary Reference Intakes (DRIs). As used herein and in the claims, the term "average daily requirement" means the minimum daily requirement (MDR), which is the amount of a nutrient that is required daily for the maintenance of good health, based on a 2,000 calorie diet. The daily requirements may vary slightly, if at all, from country to country, and it is well within the purview of those skilled in the art to obtain a recited value and adjust the composition of this invention accordingly.

As used herein and in the claims, the term "highly available" refers to lipids and peptides being in chemically simple forms that are known as such to those skilled in the art, such that the lipids and peptides/proteins are in advantageously absorbable states, or, in other words, are in forms that are quickly and readily digestible and/or absorbable.

The nutritional composition of the present invention provides required lipids and peptides in the form of oils and sources of peptides that are readily, quickly, and easily digestible, preferably along with minerals, such as calcium, copper, zinc, manganese, etc, and others that act as catalysts, with the result of improving general appearance, or physiognomy. The composition is in a form that can be ingested and absorbed very quickly so that the composition can create within the body higher concentrations of the lipids, peptides, amino acids, and minerals that are involved in forming the many tissues of the body. The resulting higher concentrations can then push the body's biological systems to create greater amounts of higher quality tissues. The result is not only enhancement of external tissues such as hair, skin, and nails, but also enhancement of internal tissues and processes such as collagen, elastin, ground substance, muscle, capillary tissue, melanogenesis (color formation), and the many other tissues and processes that can produce superior support and enrichment of the vigor, color, and tone of all visible body components.

Lipids and oils. The lipids in accordance with the present invention may comprise any edible, saturated and/or unsaturated lipids in a liquid or other quickly absorbable form, where the lipid chain corresponds to C14 to C44. Preferred lipids include those that are known to be safe for ingestion, that are relatively free of malodor or unpleasant taste, that are relatively stable, or that can be made stable, at room temperature or in the refrigerator (e.g. 5° C.) for a period of at least 12 months, or that the body can quickly metabolize along with peptides and/or amino acids that, in turn, can be used to synthesize various tissues that are important to health, vigor, and appearance. Preferred lipids also include those that are rich in omega fatty acids and that are heart healthy and free of trans fats, and glycerides of edible fatty acids derived from these lipids. Preferred dosages of lipids are from 2 to 15 grams daily. Examples of suitable lipids are safflower oil, sesame oil, almond oil, flaxseed oil, jojoba oil, fish oil, soy oil, canola oil, avocado oil, borage oil, lecithin oil, wheat germ oil, and the many other suitable lipids known to those skilled in the art.

The lipids can be used in their free form or absorbed or adsorbed on other ingestible substrates to create powders or other useful, ingestible forms. For example, the lipids can be provided as absorbed or adsorbed onto edible powders, such as powdered carbohydrates, preferably fructose, milk powder, and maltodextrin, and/or relatively non-caloric agents such as calcium silicates and other safe silicates, and/or synthetic, poorly adsorbed starches.

Peptides and proteins. The peptides and proteins in accordance with the present invention may comprise any edible source of protein that can be quickly metabolized into peptides and amino acids that the body uses in its synthesis of various tissues that are important to health, vigor, and overall appearance. Many proteins require a relatively long time to be digested to their absorbable forms and are therefore less preferable to those proteins that have a history of rapid absorption. Preferred peptides and proteins include rapidly absorbed peptides derived from animal, fish, and vegetable sources, such as beef, pork, chicken, salmon, gelatin, soy, whey, and other such peptides. Proteins and peptides derived from microbiological sources, and those made synthetically, may also be effective. Also preferable are grades that have relatively long shelf-life stability and have minimal, undesirable taste.

Other nutritional agents. Other nutritional agents in accordance with the present invention may comprise agents that enhance the formation of the dermal, epidermal, and keratin structures, such as calcium, magnesium, manganese, zinc, copper, and silica; agents that protect dermal, epidermal, and keratin structures, such as the antioxidant vitamin E, riboflavin, and biotin; and nutritionally safe agents that can enhance moisture retention in vivo after systemic ingestion, such as panthenol, pantothenic acid, pantethine, and pantetheine. Thus, vitamins, antioxidants, and minerals can be added to provide some or all of their average daily requirements. Many other agents well known in the art can be used in addition to, or in place of, these other nutritional agents.

Other useful agents. Other useful agents in accordance with the present invention include agents that are useful in preparing ingestible forms of the invented composition. While the lipids and peptides/proteins in accordance with the present invention can be ingested per se, either individually or as mixtures, many users prefer to have the lipids and peptides/proteins in a dosage form that provides for easier ingestion.

For example, the lipids and peptides/proteins may be incorporated into ingestible powders, liquids, and swallowable and chewable tablets, with flavoring added as desired. The ingestible powders in particular can incorporate relatively large amounts of the active oils and active protein/peptides used here and can be dispersed into any liquid of choice to ensure complete ingestion and compliance.

Other useful agents include agents for adsorbing and absorbing oils, including maltodextrin, fructose, and calcium silicate; agents that aid in the dispersion of the powder composition in a liquid used for ease of ingestion, including xanthan gum and surfactants such as the polysorbates; agents that aid in the dispersion of the powder composition in a liquid in the stomach, also including xanthan gum and surfactants such as the polysorbates; flavoring agents such as vanilla, chocolate and other agents that may aid ingestibility and user satisfaction; and soluble and insoluble carbohydrates that may provide sweetness, bulk, and texture that will ease oral ingestion, such as fructose, maltodextrin, and various starches. Carbohydrates and ingestible silicates in particular can act as a carrier for lipid and protein for purposes of solubilization, dispersal, and/or emulsification in an aqueous system.

Dosage, products, and usage. The required daily dosage according to the present invention is 10 to 30 grams of formula in a dry form, more preferably 15 to 25 grams, more preferably 18 to 22 grams, and more preferably about 20 grams of formula.

Products according to the present invention can be any dosage forms that quickly deliver the required lipids and peptides/proteins and any other optional components into the gastrointestinal tract. Preferable dosage forms include powders, wherein any liquid lipids have been absorbed or adsorbed onto powdered substrates. With such powders, the entire dosage can swallowed as the powdered form per se. More preferably, the powder can be dispersed in an ingestible liquid such as water, juice, milk, etc., including hot or cold liquids, as an aid to rapid and safe ingestion and then ingested immediately or within 30 minutes. Powders according to the present invention can be packaged in a bulk container with a dose-size spoon to assure accurate dosing. This is particularly useful for dosage at home. The powders can also be packaged into sealed, single dose pouches to facilitate portability and dosage away from home. No refrigeration is required. The user can disperse one dose cup or one unit dose packet of powder into any liquid of choice, such as water, juice, or milk, and stir and then swallow. This immediately provides the user with the proper dose of formula to achieve optimal bioavailability in the gastrointestinal tract and subsequent absorption.

Preferable dosage forms also include tablets, capsules, chewable tablets, liquids in multi-dose bottles, liquids in single dose cups, wafers, and edible confectionary or food supplement type bars, among other forms. Thus, properly preserved, a liquid formula is feasible to make and can be tasty. Individual, sterile dose cups (like creamers) can also be used. The invention can also be provided in chewable tablets, which can be chewed and swallowed.

In one embodiment, the invention relates to the daily oral ingestion of 20 grams of an aqueous dispersible powder containing (a) approximately 3 to 6 grams (15 to 30 w/w %) of highly available nutritional oils such as safflower, canola, and the like, which are known to enhance hair, skin, and nails, (b) 4 to 8 grams (20 to 40 w/w %) of highly available protein peptides such as soy, whey, and gelatin, also known to enhance hair, skin, and nails, and (c) a dispersant, preferably along with (d) minerals that have also been cited as aiding hair, skin, and nails, preferably plus (e) carbohydrate carriers to carry and help disperse the oils, preferably plus (f) added dispersant sweeteners, flavors, preservatives, etc. The user disperses the powder in water, juice, or any other beverage of choice and ingests it quickly, for example immediately or within 30 minutes.

In another embodiment, the invention relates to the daily oral ingestion of 20 grams of an aqueous dispersible powder containing (a) approximately 4 to 6 grams (20 to 30 w/w %) of highly available nutritional oils such as safflower, canola, and the like, plus (b) 4 to 6 grams (20 to 30 w/w %) of highly available protein peptides such as soy, whey and gelatin, preferably along with (c) minerals that have also been cited as aiding hair, skin, and nails, preferably plus (d) carbohydrate carriers to carry and help disperse the oils, preferably plus (e) added dispersant sweeteners, flavors, preservatives, etc.

In another embodiment, the invention relates to a composition including major and necessary active ingredients, corresponding to liquid unsaturated/saturated oil and peptides and proteins. The unsaturated/saturated oil, in its natural liquid state, is included at 10 to 50 w/w %, more preferably 15 to 30 w/w %. The liquid unsaturated/saturated oil comprises safflower, jojoba, fish, sesame, soy, canola, and other oils providing sources of edible unsaturated and saturated fatty acids. The oils can also be provided in the form of being absorbed or adsorbed onto edible powders, such as powdered carbohydrates, preferably fructose, milk powder, and/or maltodextrin. A preferred embodiment includes safflower oil at 15 to 25 w/w %, more preferably at 20.0 w/w %, and canola oil at 1.0 to 3.0 w/w %, more preferably at 1.5 w/w %. The peptides and protein are included at 10 to 60 w/w %, more preferably at 20 to 45 w/w %. The peptides and protein are obtained from whey, soy, gelatin, fish, meat, and other edible peptide and protein sources.

In another embodiment, the invention relates to a composition including contributing active ingredients, corresponding to carbohydrates, ingestible silicates, and minerals, which are preferred but optional ingredients. The carbohydrates are included at 20 to 60 w/w %, more preferably 25 to 40 w/w %. The carbohydrates comprise maltodextrin, fructose, lactose, starches, soluble sugars, insoluble sugars, and the like. The carbohydrates can act as carriers for the lipids and proteins for solubilization, dispersal, and/or emulsification in an aqueous system, to make the lipids and proteins more easily ingestible and pleasant tasting. Ingestible silicates, including calcium silicate, can perform these functions. The minerals comprise calcium, zinc, copper, manganese, magnesium, and others, preferably from edible sources. Each mineral is preferably provided in a weight percent so as to provide at least 10, 20, 30, 40, 50, 60, 70, 80, 90, or 100% of the average daily requirement.

In another embodiment, the invention relates to a composition including other preferred but optional ingredients, corresponding to nutritional aids and carriers. The nutritional aids comprise vitamins, anti-oxidants, and other supplements, such as vitamin E, vitamin D, biotin, various vitamin Bs such as riboflavin and vitamin B12, ascorbic acid, co-Q 10, other nutritionally safe antioxidants, and other health promoting nutritional factors. The nutritional aids are added QS as needed. The carriers comprise carbohydrates (as indicated above), sweeteners, flavors, fragrances and other odor enhancing agents, dispersants and emulsifiers, preservatives, and other helpful ingredients. The carriers are added QS as needed.

In another embodiment, the invention relates to a composition comprising: (a) safflower oil, preferably at 5 to 50 w/w %, more preferably at 10 to 35 w/w %, and more preferably at 15 to 25 w/w %; (b) soy protein, preferably at 5 to 50 w/w %, more preferably 10 to 35 w/w %, and more preferably at 15 to 30 w/w %; (c) maltodextrin, preferably at 3 to 30 w/w %, more preferably at 5 to 15 w/w %, and more preferably at 7.5 to 12.5 w/w %; (d) fructose, preferably at 10 to 50 w/w %, more preferably at 20 to 40 w/w %, and more preferably at 25 to 35 w/w %; (e) whey protein, preferably at 1 to 15 w/w %, more preferably at 2.5 to 10 w/w %, and more preferably at 4 to 7.5 w/w %; (f) gelatin powder, preferably at 1 to 15 w/w %, more preferably at 2.5 to 10 w/w %, and more preferably at 4 to 7.5 w/w %; (g) canola oil, preferably at 0 to 50 w/w %, more preferably at 0.2 to 25 w/w %, and more preferably 0.4 to 10 w/w %; (h) xanthan gum, preferably at 0 to 5 w/w %, more preferably at 0.1 to 3 w/w %, and more preferably 0.1 to 1; (i) lecithin oil, preferably at 0 to 4 w/w %, more preferably at 0.1 to 3 w/w %, and more preferably at 0.2 to 1 w/w %; and (j) calcium silicate, preferably at 0 to 3 w/w %, more preferably at 0.1 to 2 w/w %, and more preferably at 0.2 to 1 w/w %.

In another embodiment, the invention relates to a composition including (a) safflower oil at about 21.5 w/w %, wherein the safflower oil is dried onto maltodextrin, nonfat milk powder, and mixed tocopherols; (b) fructose at about 30 w/w %; (c) maltodextrin at about 2.5 w/w %; (d) nonfat milk solids at about 2.5 w/w %; (e) soy protein isolate at about 5 to 40 w/w %, more preferably at about 15 to 25 w/w %, and more preferably at about 20 w/w %; (f) whey protein concentrate at about 1 to 10 w/w %, more preferably at about 3 to 7 w/w %, and more preferably at about 5 w/w %; and (g) hydrolyzed beef gelatin at about 1 to 10 w/w %, more preferably at about 3 to 7 w/w %, and more preferably at about 5 w/w %. The carbohydrates maltodextrin and nonfat milk powder, and some of the fructose solids play a role in carrying the liquid oils. The amounts of maltodextrin, nonfat milk powder, and fructose may vary by up to plus or minus 10% due to general manufacturing variation. If amounts of the oils change, then amounts of the oil carriers will change proportionally.

In another embodiment, the invention relates to a composition including (a) safflower oil at 21.5 w/w %; (b) soy protein at 23.5 w/w %; (c) fructose at 30 w/w %; (d) whey protein at 5.0 w/w %; (e) gelatin powder at 5.0 w/w %; (f) canola oil at 0.2 w/w %; (g) xanthan gum at 0.1 w/w %; (h) lecithin oil at 1.0 w/w %; (i) calcium silicate at 0.5 w/w %; (j) flavor added QS as needed; and (k) maltodextrin added QS as needed. The carbohydrates maltodextrin and fructose play a role in carrying the liquid oils.

In another embodiment, the invention includes a composition optionally comprising the following components at the amounts indicated, per 20 gm of the composition: (a) vitamin E at 0.204 w/w %, corresponding to 30 international units of vitamin E, in the form of 40.8 mg vitamin E acetate; (b) riboflavin at 0.005 w/w %, corresponding to 0.1 mg of riboflavin; (c) calcium at 3.125 w/w %, corresponding to 250 mg of calcium, in the form of 625 mg of calcium carbonate; (d) magnesium at 0.83 w/w %, corresponding to 100 mg of magnesium, in the form of 167 mg of magnesium oxide; (e) zinc at 0.094 w/w %, corresponding to 15 mg of zinc, in the form of 18.75 mg of zinc oxide; (f) copper at 0.040 w/w %, corresponding to 2 mg copper, in the form of 8.2 mg copper gluconate; (g) manganese at 0.008 w/w %, corresponding to 0.2 mg manganese, in the form of 1.60 mg manganese gluconate; and (h) biotin at 0.00012 w/w %, corresponding to 25 micrograms of biotin.

The following Examples are being presented in order to further illustrate the invention. The Examples should not be construed as limiting the invention in any manner.

Example 1

A nutritional composition in the form of a dry powder for aqueous dispersion, in accordance with the present invention, was made using the following ingredients in the following weight percentages:

| Ingredient | w/w % |
| --- | --- |
| safflower oil (e.g. Croda, food grade) | 21.5 |
| soy protein (e.g. SPI Supro, food grade) | 23.5 |
| fructose (e.g. ADM et al, food grade) | 30.0 |
| whey protein (Whey Protein Isolate, food grade) | 5.0 |
| gelatin powder, Kosher (e.g. FIT) | 5.0 |
| canola oil (e.g. Welch-Home-Clark) | 0.2 |
| xanthan gum (food or drug grade (e.g. Alpha Chem) | 0.1 |
| lecithin oil (food grade, e.g. Puritan et al) | 1.0 |
| calcium silicate USP | 0.5 |
| vitamin E acetate USP | 0.204 |
| riboflavin USP | 0.005 |
| calcium (as calcium carbonate - USP) | 3.125 |
| magnesium (as magnesium oxide, USP) | 0.83 |
| zinc (as zinc oxide, USP) | 0.094 |
| copper (as copper gluconate, USP) | 0.040 |
| manganese (as manganese gluconate, USP) | 0.008 |
| biotin (USP) | 0.00012 |
| flavor (food grade flavors - any reliable source) | QS |
| maltodextrin (food grade or USP - any reliable source) | QS to 100% |

The ingredients were obtained from commercial suppliers. Safflower oil was obtained in a form that had been dried onto maltodextrin in advance. Preparation of the mixed powder composition can be accomplished by use of techniques and equipment that are known in the art. The formulation corresponds to the BEAUTY SCOOP™ brand edible nutritional composition for enhancing external physiognomy.

Example 2

A nutritional composition in the form of a liquid dispersion of a dry powder, in accordance with the present invention, was made by adding 20 grams of the dry powder composition of Example 1 to two or more ounces of water or any liquid of the user's choice (e.g. juices, etc., including hot or cold liquids). Dispersion of the powder composition into the water or other desired liquid can be accomplished by use of techniques and equipment that are known in the art.

Example 3

A study of the effects of ingestion of the composition of Example 2 was carried out. One hundred eighty-one women were selected as participants. Participants ranged in age from twenty-six to eighty and had imperfections associated with their hair, skin, and/or nails. Prior to the start of administration, the participants were characterized as follows: 89% regularly eat a healthy diet, 79% regularly exercise, 63% regularly take nutritional supplements, and 74% regularly take vitamins. Certain characteristics were a basis for exclusion from the study, namely (1) being pregnant, (2) having an allergy to soy or milk products, or (3) having received a dermatological diagnosis of a disorder of the hair, skin, or nails.

The duration of the study for each participant was at least three weeks. Over this course of time, participants were supplied with a daily dose that was equivalent to 20 grams of the dry powder composition of Example 1. Participants were instructed to disperse the dose in 2 to 8 ounces of a liquid of their choice, once per day, and to consume the dose within 30 minutes of dispersal. Participants were also instructed to record their preferences in terms of type of liquid and amount.

Participants were asked to abide by certain restrictions. Specifically, participants were asked to preclude manicures (72% regularly get manicures), pedicures (63% regularly have pedicures), and hair coloring and treatment (79% regularly color their hair) and also to preclude use of any other internal or external products or treatments that could affect their hair, skin, or nails. Participants were otherwise instructed to consume their usual diets and to maintain their current exercise regimens. Participants were also instructed to report any deviations from the above restrictions, as well as any weight loss or illness during the trial period.

Participants were given a consent form and a questionnaire and self-rating scale. Thirteen symptoms were rated: dullness, dryness, brittleness, and unmanageability of the hair; dryness, cracking, breaking, and splitting of the nails; and, dryness, roughness, cracking, peeling, and scaling of the skin. In addition, fine lines and wrinkles were assessed by the participant and confirmed by an observer using the methods described by Packman, E. W. and Gans, E. H., "Topical Moisturizers: quantification of their effect on superficial facial lines", J. Soc. Cosmet. Chem, 29, 79-90, (February 1978).

Of the 181 participants, 150 participated in blinded study groups, evaluated by independent observers. In addition, thirty-one patient participants were rated by the doctor prior to the inception of the study and upon completion of the trial. In order to qualify for participation, each patient was required to have a significant problem in at least one area (hair, skin, or nails), or mild problems in two or more areas.

All participants completed the full trial. The results were as follows. Overall, 86% of participants noticed an improvement in all three areas, namely their hair, skin, and nails, within three weeks. By the end of the first week of administration the percentages of participants that noticed an improvement in nails, hair, and skin were 78%, 56%, and 44%, respectively. By the end of the second week of administration the percentages of participants that noticed an improvement in nails, hair, and skin were 94%, 78%, and 50%, respectively. By the end of the third week of administration the percentages of participants that noticed an improvement in nails, hair, and skin were 100%, 83%, and 61%, respectively.

Example 4

The following are testimonials from users of the liquid dispersion composition of Example 2, according to the study of Example 3. Importantly, participants were neither solicited to give testimonials nor asked about the effect of the treatment on their overall appearance (i.e. physiognomy). Nonetheless, over half of the unsolicited testimonials were directed toward improvements in overall appearance. This was an unexpected and surprising result.

"It was fantastic! It was delicious and I don't usually like shakes and powdered drinks. I prefer this to a pill as it is all natural and in a drink . . . . It is the 'scoop' in attaining beauty. Even my facialist noticed the changes in my skin," from RL, an actor & talk show host.

"My hair looked amazing. My skin had no breakouts. I loved the taste and it was the first thing ever to replace my 4:00 PM cookie break! Now that I finished the product, I want more. I am super low maintenance but I would absolutely keep taking this because I got a bunch of compliments when I was using it," from RS, talent agent.

"I really enjoyed using this product. I loved the taste and found myself craving it throughout the day. It is a good mixture for beauty enhancement. I really saw a difference in my overall appearance and I even got comments from others on how good I look. It was not just the noticeable improvements in my hair, skin and nails . . . but something more . . . . I looked better overall," from JS, graduate student.

"This product improved my skin, hair and nails above and beyond my expectations. It's a real beauty secret," from AP, department store manager.

"I normally hate shakes and drinks, but this one actually tasted good! Now I can drink my way to great nails. I used nail strengthener and ridge fillers to hide my problems before . . . . But this product actually improved my condition, rather than just hide it," from RH, real estate developer.

"This product has a great taste and blends well with water, milk or juice. It is healthy beauty taken to a new level," from CA, public school teacher.

"It takes only one scoop a day to be more beautiful," from BM, European Personnel Chef.

"Since using [the formulation], my skin looks like it did when I was 15 yrs old!" from KD, Film & TV Actress.

"Delivers on its promises! Unlike other natural products, this one actually works," from LR, Pilates Instructor.

"It just works," from JM, Actress & singer.

"It worked great on my nails . . . and on my hair and face too," from Judy B, Voice over Actress.

"I was very pleased, especially with nails—my manicurist even noticed. I loved the taste. It's an easy Beauty thing to do," from DM, I. Trump's Personal Assistant.

"Delicious, nice texture" from NW, former Music Producer.

"Very pleased, especially with the improvement and strength of my nails," from MJ, NIH Researcher.

"This product works and it is so easy to use," from LR, stay-at-home Mother.

"I had a crack in my nails and it is now gone! I am very pleased and pleasantly surprised," from EA, Pet Store Owner.

"I would definitely recommend it to all of my friends," from KG, Interior Designer.

"My nails were growing and they stopped cracking and splitting," from MT, School Nurse.

"I definitely saw improvements in my hair and nails. I like the taste and find it filling, like a meal replacement. It is the 'inside scoop' on beauty—ahead of the curve—and users are those in the know," from Fran H, Pharmaceutical Consultant.

"This give me a lift and it works," from DC, TV producer.

"Fun. Smart. Hip and cute. Yum! My LA hairdresser asked what I have been using with my hair, because she saw all of this new hair growth and noticed that my roots were super strong," from AR, Golden Globe Award Winning Actor.

"I saw results (overall) within 10 days of starting the product . . . and the travel packets made it a no-brainer," from TB, TV & Film Actress.

"I saw more hair on Alysia's scalp—new growth and enlarged pores. The texture was improved and there was stimulation of new growth. I can't wait to recommend this to my clients," from VV, LA Celebrity Hair Dresser.

"It improved my nails tremendously. I had a hard time growing them as I've bitten them all of my life, —and now (after Beauty Scoop) they are great—long, strong and healthy". This is a secret—the inside scoop on beauty!" from RS, Talent Agent.

"I have had a huge 'a-ha' because of it . . . . I used less moisturizers and cleansers while I was on it . . . . My skin didn't seem to need them . . . . And within two weeks of stopping it . . . , I noticed a definite shift in my skin—it was once again very dry. This is the inside track on a hot new item for my beauty and health! Excellent taste—nice afternoon treat." From MR, TV & Film Actor.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A method of rapidly enhancing the general appearance of a person by improving imperfections associated with the person's hair, skin, and/or nails, comprising oral ingestion once per day, by the person, of 10 to 30 grams of a nutritional composition comprising:
   a nutritional oil at 15 to 30 w/w %,
   a protein or peptide at 20 to 40 w/w %,
   a dispersant,
   vitamin E,
   riboflavin,
   calcium,
   magnesium,
   zinc,
   copper,
   manganese, and
   biotin,
   wherein the protein or peptide comprise gelatin; the oil and the protein or peptide are highly available and are known to enhance hair, skin, and nails; and systemic ingestion of the nutritional composition by the person results in rapid overall enhancement of the general appearance of the person by improving the imperfections associated with the person's hair, skin, and/or nails.

2. A method of rapidly enhancing the general appearance of a person by improving imperfections associated with the person's hair, skin, and/or nails, comprising oral ingestion once per day, by the person, of 10 to 30 grams of a nutritional composition comprising:
   safflower oil at 5 to 50 w/w %;
   soy protein at 5 to 50% w/w %;
   maltodextrin at 3 to 30 w/w %;
   fructose at 10 to 50 w/w %;
   whey protein at 1 to 15 w/w %;
   gelatin powder at 1 to 15 w/w %;
   vitamin E;
   riboflavin;
   calcium;
   magnesium;
   zinc;
   copper;
   manganese; and
   biotin;
   wherein systemic ingestion of the nutritional composition by the person results in rapid overall enhancement of the general appearance of the person by improving the imperfections associated with the person's hair, skin, and/or nails.

3. The method of claim 1, said nutritional oil being selected from the group consisting of safflower, jojoba, fish, sesame, soy, canola, avocado, borage, flaxseed, salmon, lecithin, wheat germ, an oil having an omega fatty acid, and a synthetic oil.

4. The method of claim 1, said nutritional oil and said protein or peptide each being of a grade that has a relatively long shelf-life stability and minimal undesirable taste.

5. The method of claim 1, wherein the dispersant is present in the nutritional composition at 25 to 40 w/w %, the dispersant being selected from the group consisting of carbohydrate, maltodextrin, fructose, lactose, starch, soluble sugar, insoluble sugar, ingestible silicate, and calcium silicate, wherein the dispersant acts as a carrier for the lipid and protein for solubilization, dispersal, and/or emulsification in an aqueous system.

6. The method of claim 1, wherein the nutritional composition further comprises a nutrient selected from the group consisting of panthenol, pantothenic acid, pantethine, pantetheine, and nutritionally safe agents that can enhance moisture retention in vivo after systemic ingestion.

7. The method of claim 3, wherein:
   said nutritional oil and said protein or peptide each are of a grade that has a relatively long shelf-life stability and minimal undesirable taste; and the dispersant is present in the nutritional composition at 25 to 40 w/w %, the dispersant being selected from the group consisting of carbohydrate, maltodextrin, fructose, lactose, starch, soluble sugar, insoluble sugar, ingestible silicate, and calcium silicate, wherein the dispersant acts as a carrier for the lipid and the protein or peptide for solubilization, dispersal, and/or emulsification in aqueous system.

8. The method of claim 1, wherein said nutritional composition further comprises a powder that is dispersible in aqueous liquid.

9. The method of claim 1, wherein said nutritional composition further comprises an aqueous dispersion or an emulsion.

10. The method of claim 2, wherein the nutritional composition further comprises:
    canola oil at 0.20 to 25 w/w %;
    xanthan gum at 0.1 to 3.0 w/w/%;
    lecithin oil at 0.1 to 3.0 w/w %; and
    calcium silicate at 0.1 to 2.0 w/w %.

11. The method of claim 10, wherein:
    the vitamin E is present in the composition at 0.204 w/w %;
    the riboflavin is present in the composition at 0.005 w/w %;
    the calcium is present in the composition at 3.125% w/w %;
    the magnesium is present in the composition at 0.083 w/w %;
    the zinc is present in the composition at 0.085 w/w %;
    the copper is present in the composition at 0.055%;
    the manganese is present in the composition at 0.00625%; and
    the biotin is present in the composition at 0.00012%.

12. The method of claim 11, wherein the nutritional composition is a powder that is dispersible in aqueous liquid and that has a shelf-life of at least 18 months at room temperature.

13. The method of claim 11, wherein the nutritional composition is a dispersion in aqueous liquid.

14. The method of claim 11, wherein:
    the safflower oil is present in the composition at 10 to 35 w/w %;
    the soy protein is present in the composition at 10 to 35% w/w %;
    the maltodextrin is present in the composition at 5 to 15 w/w %;
    the fructose is present in the composition at 20 to 40 w/w %;
    the whey protein is present in the composition at 2.5 to 10 w/w %; and
    the gelatin powder is present in the composition at 2.5 to 10 w/w %.

15. The method of claim 11, wherein:
    the safflower oil is present in the composition at 15 to 25 w/w %;

the soy protein is present in the composition at 15 to 30% w/w %;
the maltodextrin is present in the composition at 7.5 to 12.5 w/w %;
the fructose is present in the composition at 25 to 35 w/w %;
the whey protein is present in the composition at 4 to 7.5 w/w %; and
the gelatin powder is present in the composition at 4 to 7.5 w/w %.

* * * * *